United States Patent [19]
Walsh

[11] Patent Number: 6,146,779
[45] Date of Patent: Nov. 14, 2000

[54] FLUID FLOW PLATE, FUEL CELL ASSEMBLY SYSTEM, AND METHOD EMPLOYING SAME FOR CONTROLLING HEAT IN FUEL CELLS

[75] Inventor: Michael M. Walsh, Fairfield, Conn.

[73] Assignee: Plug Power Inc., Latham, N.Y.

[21] Appl. No.: 09/283,391

[22] Filed: Apr. 1, 1999

[51] Int. Cl.[7] .................................................. H01M 8/04
[52] U.S. Cl. .............................. 429/26; 429/24; 429/120; 429/34
[58] Field of Search ................................ 429/24, 26, 120, 429/34

[56] References Cited

U.S. PATENT DOCUMENTS

| | | |
|---|---|---|
| 3,865,630 | 2/1975 | Reimers . |
| 4,853,100 | 8/1989 | Hsu .......................................... 204/256 |

OTHER PUBLICATIONS

Feldman et al., The heat pipe. Mechanical Engineering: Feb. 1997, pp. 30–33, Feb. 1967.

*Primary Examiner*—Maria Nuzzolillo
*Assistant Examiner*—Tracy Dove
*Attorney, Agent, or Firm*—Heslin & Rothenberg, P.C.

[57] ABSTRACT

A fluid flow plate for a fuel cell includes a generally planar-shaped body having a sealed chamber therein containing a heat-transferring fluid. A first portion of the body has an outer surface with at least one flow channel for distributing a first reactant fluid to an active region of the fuel cell. The first portion is operable to absorb heat to vaporize the heat-transferring fluid and a second portion, preferably extending beyond the active region, is operable to release heat for condensing vaporized heat-transferring fluid. Also disclosed is a system which includes a fuel cell assembly having a plurality of fuel cells and a plurality of planar-shaped heat pipes disposed between the plurality of fuel cells. A housing comprises a chamber for receiving a reactant fluid. The plurality of planar-shaped heat pipes extend into the chamber for transferring heat between the fuel cell assembly and a reactant fluid.

28 Claims, 10 Drawing Sheets

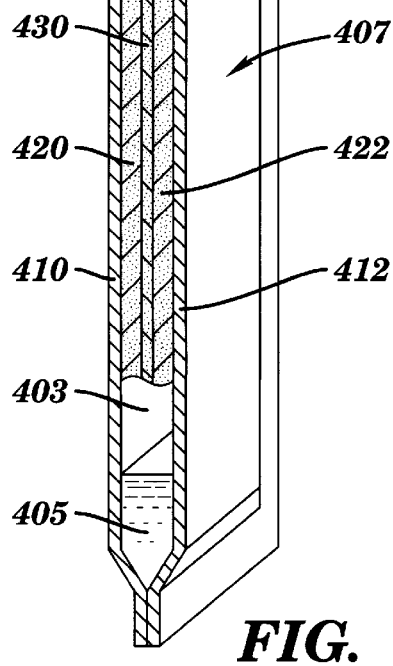
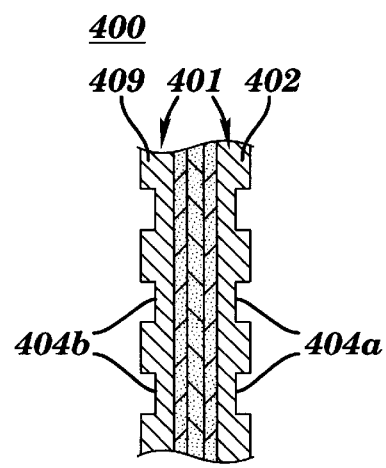
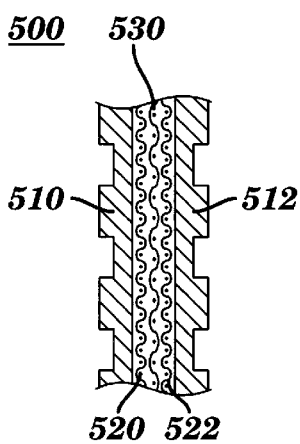
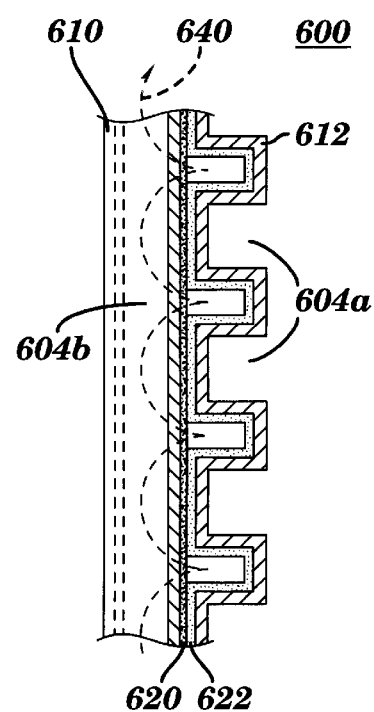
FIG. 5
FIG. 6
FIG. 7
FIG. 8

FLUID FLOW PLATE, FUEL CELL ASSEMBLY SYSTEM, AND METHOD EMPLOYING SAME FOR CONTROLLING HEAT IN FUEL CELLS

TECHNICAL FIELD

This invention relates generally to fuel cells and, more particularly, to fluid flow plates and fuel cell assembly systems employing heat pipes for controlling heat in fuel cells.

BACKGROUND INFORMATION

Fuel cells electrochemically convert fuels and oxidants to electricity. Fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidant such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As is known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell.

The PEM can be made using, for instance, a polymer such as the material manufactured by E. I. Du Pont De Nemours Company and sold under the trademark NAFION®. Further, an active electrolyte such as sulfonic acid groups are included in this polymer. In addition, the PEM is available as a product manufactured by W. L. Gore & Associates (Elkton, Md.) and sold under the trademark GORE-SELECT®. Moreover, a catalyst such as platinum which facilitates chemical reactions is applied to each side of the PEM. This unit is commonly referred to as a membrane electrode assembly (hereinafter "MEA"). The MEA is available as a product manufactured by W. L. Gore & Associates and sold under the trade designation PRIMEA 5510-HS.

In a typical PEM-type fuel cell, the MEA is sandwiched between "anode" and "cathode" gas diffusion layers (hereinafter "GDLs") that can be formed from a resilient and conductive material such as carbon fabric. The anode and cathode GDLs serve as electrochemical conductors between catalyzed sites of the PEM and the fuel (e.g., hydrogen) and oxidant (e.g., air/oxygen) which flow in respective "anode" and "cathode" flow channels of respective flow field plates.

A given fluid flow plate can be formed from a conductive material such as graphite. Flow channels are typically formed on one or more faces of the fluid flow plate by machining. As is known in the art, a particular fluid flow plate may be a bipolar, monopolar, anode cooler, cathode cooler, or cooling plate.

The conversion of the fuel and oxidants to electricity in a fuel cell assembly also produces heat, particularly at high current/power densities, which is typically removed to maintain the fuel cell assembly at a safe operating temperature. For example, circulating liquid cooling systems have been employed to circulate cooling liquid through passageways in the fuel cell assembly to remove heat. Such circulating liquid cooling systems typically require a pump, connecting tubes, an expansion tank, radiator, thermal and/or other controls. In addition to the added expense and the complexity of integrating the circulating liquid cooling system with the fuel cell assembly, other drawbacks include the need to provide electrical power for operating the pump, the pump is subject to mechanical failure, the coolant may become contaminated or ionized resulting in electrical short circuits or shunts in the fuel cell assembly, and the coolant fluid may leak into the fuel cell reaction areas and/or freeze-up.

Other attempts to remove heat from fuel cell assemblies have incorporated heat pipes. For example, U.S. Pat. No. 5,262,249 to Beal et al. discloses a fuel cell employing a circulating liquid cooling system in combination with a heat pipe.

U.S. Pat. No. 5,064,732 to Meyer discloses a fuel cell having an anode and a cathode, an anode chamber, a cathode chamber, an electrolyte membrane, and a hydrophilic porous elements interposed between each cell stack. A regulator regulates the introduction of reactant gases directly into the cathode and anode chambers. The fuel cell stack temperature is regulated via a heat pipe system which removes waste heat. See also, U.S. Pat. No. 5,358,799 to Gardner, and U.S. Pat. No. 4,578,324 to Koehler et al.

A drawback with the above-noted fuel cell assemblies, which incorporate separate heat pipes, is that the heat pipes increase the length of the fuel cell assemblies which reduces the current/power density of the fuel cell assemblies. Another drawback with the above-noted systems is that providing separate heat pipes which are interspersed between the fuel cells, requires heat to be transferred across the interface between the fuel cell and the heat pipe.

Therefore, there exists a need for fuel cells and fuel cell assemblies which integrally incorporate heat pipes into the fuel cells so that the fuel cell assemblies may be compactly configured and heat may be readily and efficiently removed from the fuel cells. In addition, there is a need for fuel cell assemblies incorporating and employing heat pipes for transferring heat between the fuel cell and a supply of one or more reactant fluids for the fuel cells.

SUMMARY OF THE INVENTION

The shortcomings of the prior art are overcome and additional advantages provided according to one embodiment of the present invention by providing a fluid flow plate for use in a fuel cell in which the fluid flow plate comprises a generally planar-shaped body having a sealed chamber therein containing a heat-transferring fluid. The body includes a first portion operable to absorb heat to vaporize the heat-transferring fluid and a second portion operable to release heat for condensing vaporized heat-transferring fluid, and the first portion of the body has an outer surface with at least one flow channel for distributing a first reactant fluid to an active region of the fuel cell.

Desirably, the second portion of the body extends beyond the active region of the fuel cell and the at least one flow channel is integrally formed in said body. The body may also include at least one passageway extending through the body for receiving a reactant fluid, and the at least one flow channel may further comprise an inlet opening onto the passageway.

In another aspect of the present invention, a fuel cell assembly system includes a fuel cell assembly having a plurality of fuel cells, at least one planar-shaped heat pipe interspersed between the plurality of fuel cells, a housing comprising at least one reactant supply chamber for receiving at least one supply of reactant fluid, and wherein the at least one planar-shaped heat pipe extends into the at least one reactant supply chamber for transferring heat between the fuel cell assembly and the supply of reactant fluid. Desirably, the at least one reactant supply chamber comprises a first chamber and a second chamber and the at least one supply of reactant fluid comprises a supply of fuel and a supply of oxidant.

In another aspect of the present invention, a method is provided for forming a fluid flow plate in which the method comprises the steps of providing a pair of generally planar-shaped members, forming at least one flow channel on a surface of one of the pair of generally planar-shaped members, providing a wick, providing a heat-transferring fluid, and sealing the pair of generally planar-shaped members to seal the wick and the heat-transferring material within a chamber formed by the generally planar-shaped members.

In still another aspect of the present invention, a method is provided for controlling heat in a fuel cell assembly system which includes the steps of providing a plurality of heat pipes interspersed in a fuel cell assembly, and transferring heat via the plurality of heat pipes between the fuel cell assembly and a first supply of a reactant fluid. The method may further include the step of transferring heat via the plurality of heat pipes between the first supply of reactant fluid and a second supply of reactant fluid.

In a further aspect of the present invention, a method is provided for controlling heat in a fuel cell assembly system which includes the steps of providing a fuel cell assembly comprising a plurality of fluid flow plates having a sealed chamber therein containing a heat-transferring fluid and having an outer surface having at least one flow channel for distributing a first reactant fluid to an active region of the fuel cell, and transferring heat via the plurality of fluid flow plates away from the active area of the fuel cell assembly. The method may further include the steps of transferring heat via the plurality of fluid flow plates between the fuel cell assembly and the first supply of reactant fluid, and/or transferring heat via the plurality of fluid flow plates between the first reactant fluid and a second reactant fluid.

In yet another aspect of the present invention, a method is provided for controlling the temperature of reactant fluids to a fuel cell which includes the step of providing at least one heat pipe, providing a first supply of reactant fluid, providing a second supply of reactant fluid, and transferring, via said heat pipe, between the first supply of reactant fluid and the second supply of reactant fluid.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 5 is a cross-sectional view taken along line 5—5 in FIG. 4 showing the interior of the fluid flow plate;

FIG. 6 is a cross-sectional view taken along line 6—6 in FIG. 4 showing the interior of the fluid flow plate in the active region;

FIG. 7 is a cross-sectional view through an alternative embodiment of a fluid flow plate according to the present invention;

FIG. 8 is a cross-sectional view through an another alternative embodiment of a fluid flow plate according to the present invention;

DETAILED DESCRIPTION OF THE PREFERRED EMBODIMENTS

Figure 1:
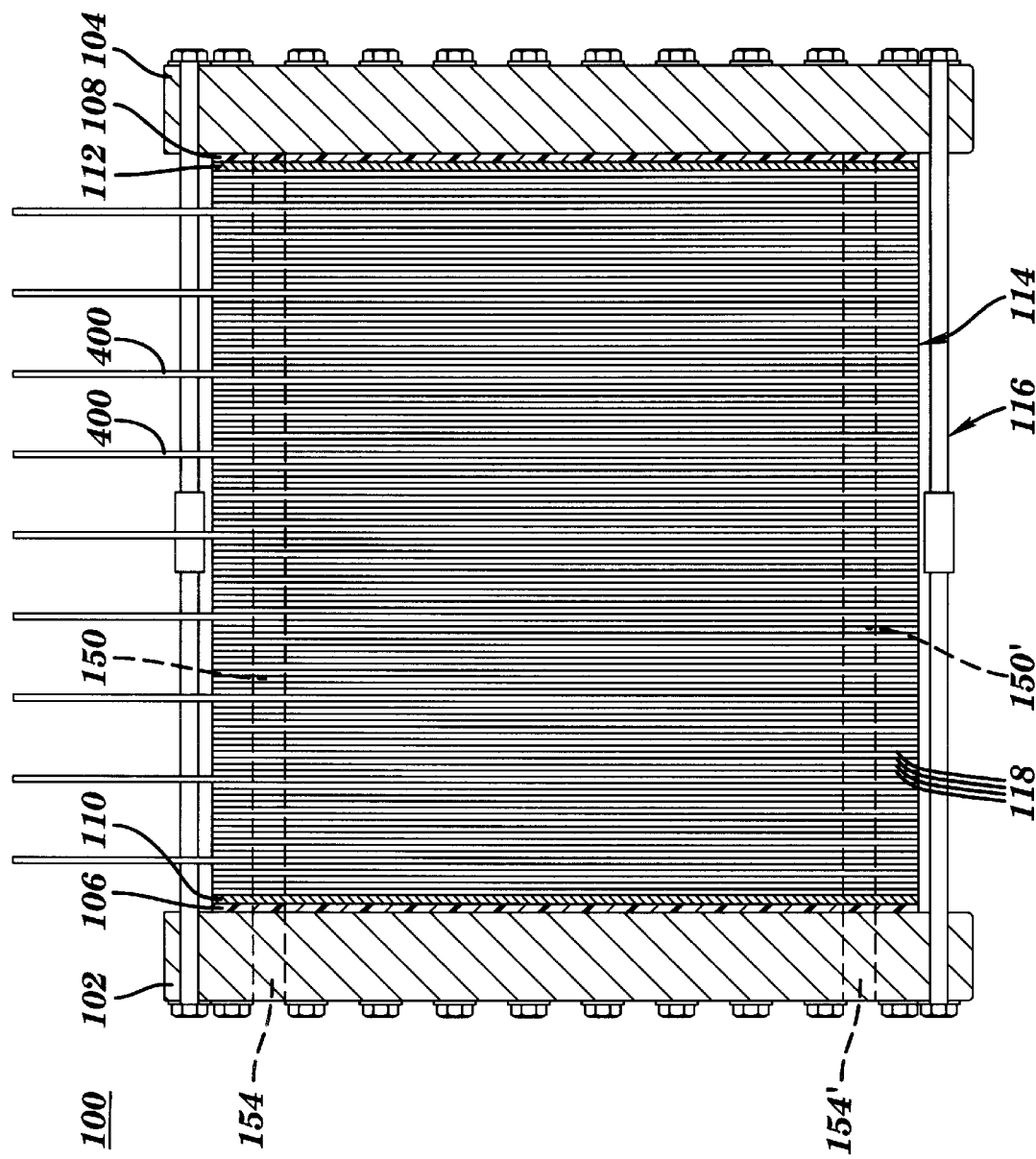
FIG. 1 is a sectional, side elevational view of one embodiment of a fuel cell assembly according to the present invention.

An example of a fuel cell assembly incorporating novel features of the present invention is depicted in FIG. 1. In this exemplary embodiment, a fuel cell assembly 100 includes end plates 102 and 104, insulation layers 106 and 108, and current collector/conductor plates 110 and 112, with a working section 114 therebetween. The working section includes one or more active sections or regions. A number of structural members 116 can be employed to join end plates 104 to 106.

Working section 114 includes a number of layers 118. The layers generally form fluid manifolds 150 and 150' for supplying reactant gas or fluids to, removing fluids from, and otherwise communicating and/or servicing fluids as desired within working section 114, as will be appreciated by those skilled in the art. The layers of fuel cell assembly 100 might have applied thereto compressive forces which are approximately fifty to one thousand pounds per square inch, and, preferably, two hundred to four hundred pounds per square inch.

Figure 3:
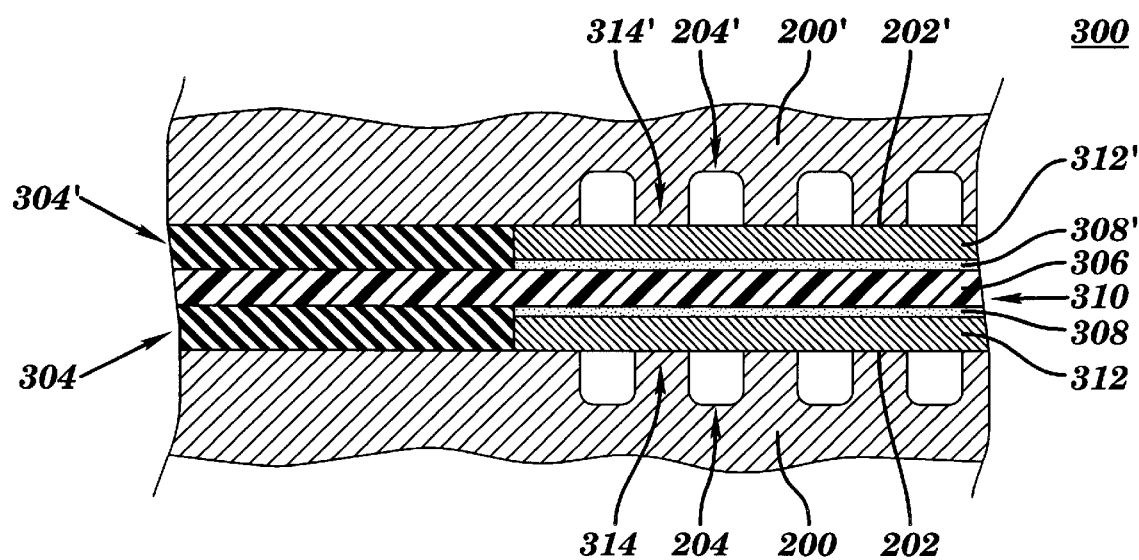
FIG. 3 is a partial, enlarged, sectional, side elevation view of the fluid flow plates in a fuel cell of the fuel cell assembly shown in FIG. 1.

A plurality of layers 118 may form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
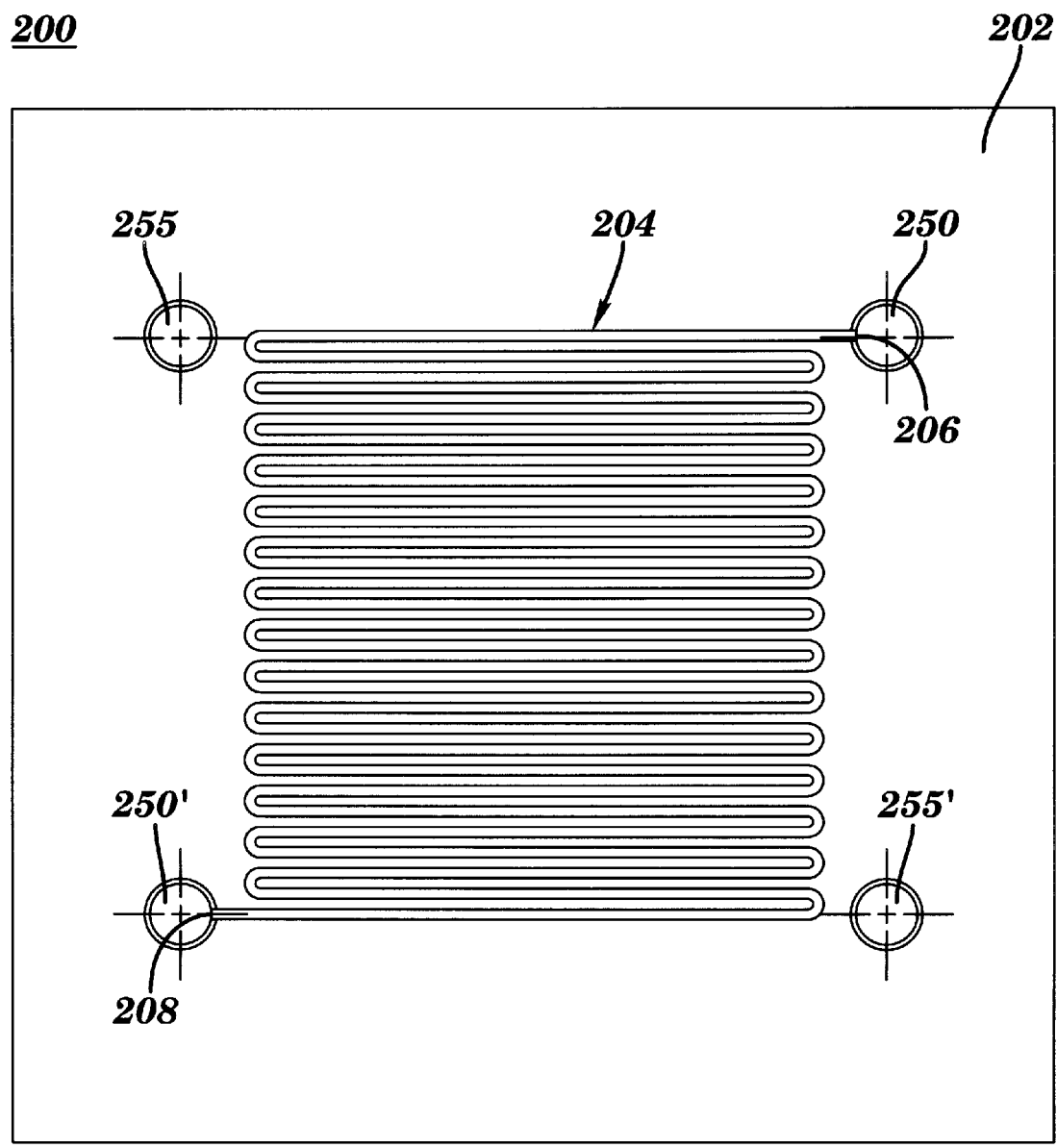
FIG. 2 is a plan view of a surface of a fluid flow plate for distributing one or more reactant gases over an active region of the fuel cell assembly shown in FIG. 1.

One example of a layer 118 of working section 114 is depicted in FIG. 2 as a fluid flow plate 200. Fluid flow plate 200 has a fluid flow face 202 with at least one generally serpentine flow channel 204 thereon. Flow channel 204 receives and transmits one or more fluids through an inlet 206 and out an outlet 208 which are in fluid communication with and open onto corresponding passageways 250 and 250', which form respective portions of fluid manifolds 150 and 150'.

As will be understood by those skilled in the art, a given fluid flow plate 200 may be monopolar or bipolar. In one example, fluid flow plate 200 serves as a flow field plate and flow channel 204 conducts fluid which includes reactant fluid for fuel cell assembly 100 (FIG. 1). The reactant fluid serves as fuel or oxidant for a given fuel cell 300 (FIG. 3). For instance, the flow channel can carry reactant gas (e.g., a fuel such as hydrogen or an oxidant such as air/oxygen) as well as a liquid (e.g., humidification 1404.026 and/or product water), as will be understood by those skilled in the art.

With reference still to FIG. 2, fluid flow plate 200 may also include a number of passageways 255 and 255' therethrough, which can cooperate in formation of fluid manifolds of fuel cell assembly 100, e.g., for supply of reactant fluid to a flow channel (not shown in FIG. 2) on the opposite side of fluid flow plate 200. Preferably, the perimeters of layers 118 (FIG. 1) are formed with minimal amounts of material disposed generally transversely beyond the active region of working section 114 as well as the fluid supply manifolds of fuel cell assembly 100.

Referring to FIG. 3, gasketing material or gaskets 304 and 304' can be employed to seal passageways 250. 250', 255, and 255' (FIG. 2) and cooperate with the longitudinal extents of layers 118 (FIG. 1) in formation of the fluid supply manifolds. A given gasket 304 and 304' might take the form of, for instance, a frame gasket made from a polytetrafluoroethylene ("PTFE") material manufactured by E. I. Du Pont de Nemours Company and sold under the trademark TEFLON®. In another embodiment, multiple O-ring gaskets might be employed.

For purposes of illustration, FIG. 3 depicts fuel cell 300 with fluid flow plates 200 and 200' serving as flow field plates. In particular, fluid flow plate 200 might serve as an anode side of the fuel cell, and fluid flow plate 200' might serve as a cathode side of the fuel cell. That is, face 202 of fluid flow plate 200 might be an anode face, and face 202' of fluid flow plate 200' might be a cathode face. For instance, flow channel 204 of fluid flow plate 200 might carry hydrogen, as fuel, and humidification water. Further, a flow channel 204' of fluid flow plate 200' might carry air/oxygen, as oxidant, as well as humidification water and/or product water, as will be understood by those skilled in the art.

Fuel cell 300 includes a membrane or solid electrolyte 306. Preferably, solid electrolyte 306 is a solid polymer electrolyte made using a polymer such as a material manufactured by E. I. Du Pont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed with a product manufactured by W. L. Gore & Associates and sold under the trade designation PRIMEA 5510-HS.

MEA 310 is sandwiched between anode and cathode gas diffusion layers (hereinafter "GDLs") 312 and 312', respectively, which can be formed with a resilient and conductive material such as carbon fabric or carbon fiber paper. In one embodiment of gas diffusion layers 312 and 312', porous carbon cloth or paper is infused with a slurry of carbon black and sintered with TEFLON® material.

The anode and cathode GDLs serve as electrochemical conductors between catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of the MEA a combination of microscopic porosity and macroscopic porosity. Microscopic porosity allows reactant gas molecules to pass generally longitudinally from the flow channel to a surface of the MEA. Macroscopic porosity allows product water formed at the cathode surface of the MEA to be removed therefrom by flowing generally longitudinally into the cathode flow channel, to prevent flooding of the catalyst particles.

Figure 4:
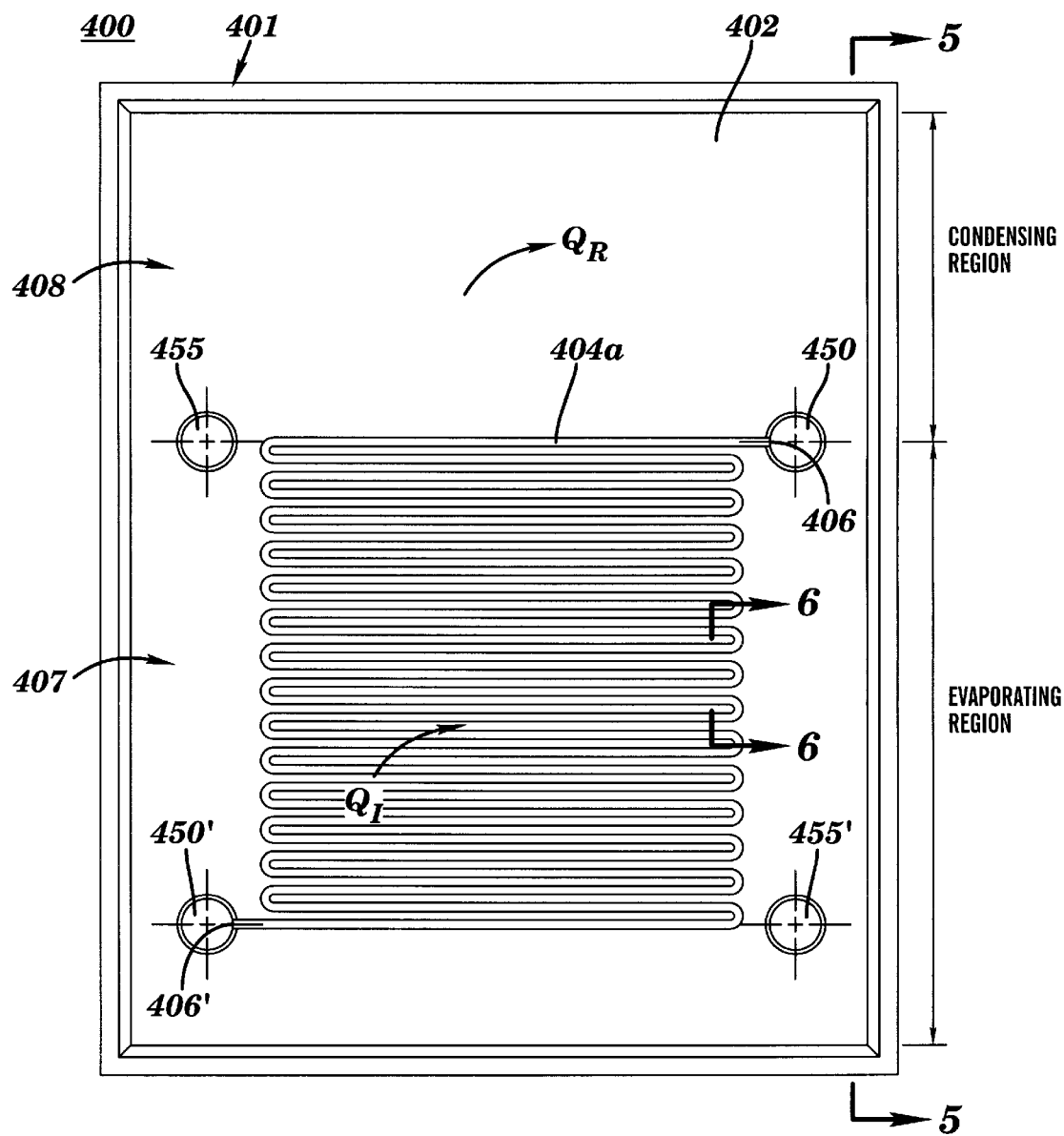
FIG. 4 is a plan view of a surface of one embodiment of a fluid flow plate according to the present invention for distributing one or more reactant gases to an active region of a fuel cell and for cooling the fuel cell assembly shown in FIG. 1.

As shown in FIGS. 4–6, a layer 118 of working section 114 according to the present invention may comprise a fluid flow plate 400 which is configured to conduct fluid, e.g., one or more reactant fluids for fuel cell assembly 100 (FIG. 1) as described above with reference to fluid flow plate 200. In addition, fluid flow plate 400 is also configured to remove heat, via a liquid to gas phase transition, from working section 114 as explained in greater detail below.

Fluid flow plate 400 includes a generally planar-shaped body 401 having a surface 402 with a flow channel 404a desirably integrally formed thereon. Flow channel 404a receives and transmits one or more reactant fluids (e.g., a fuel such as hydrogen or an oxidant such as air/oxygen) through an inlet 406 and out an outlet 406' which are in fluid communication with and open onto corresponding passageways 450 and 450' which form respective portions of supply manifolds 150 and 150'.

As shown in FIG. 6, fluid flow plate 400 also has an opposite surface 409 having one or more flow channels 404b desirably integrally formed thereon. Flow channel 409 receives and transmits one or more reactant fluids (e.g., a fuel such as hydrogen or an oxidant such as air/oxygen) through an inlet and out an outlet (not shown) which are in fluid communication with and open onto corresponding passageways 455 (FIG. 4) and 455' (FIG. 4) which form respective portions of a second pair of fluid supply manifolds.

Figure 9:
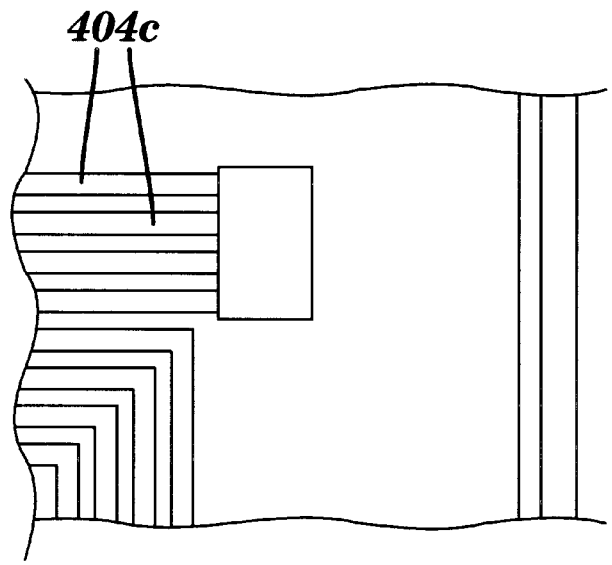
FIG. 9 is a partial plan view of another alternative embodiment of a fluid flow plate according to the present invention.
Figure 10:
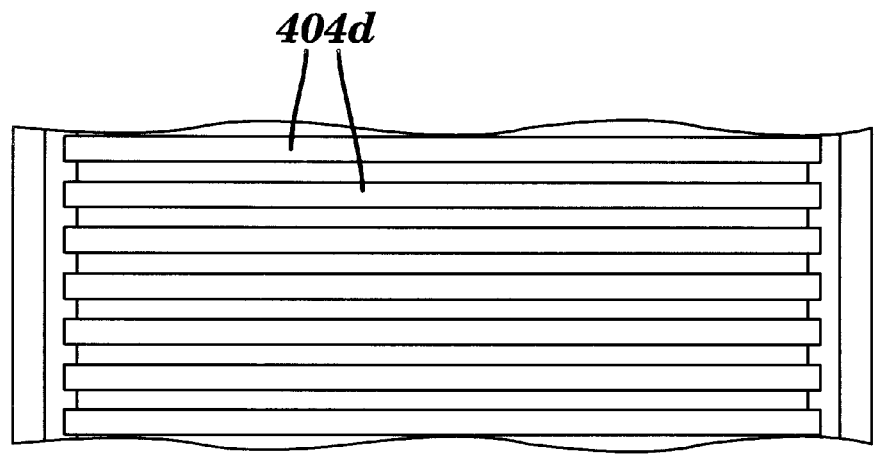
FIG. 10 is a partial plan view of another alternative embodiment of a fluid flow plate according to the present invention.

While, flow channel 404a may have a single serpentine configuration as shown in FIG. 4, other configurations may include a plurality of serpentine flow channels 404c as shown in FIG. 9, or a plurality of parallel spaced-apart flow channels 404d which extend to the peripheral edge of the fluid flow plate, as shown in FIG. 10. Such parallel flow channels 404d are suitable, e.g., for readily supplying ambient air to a fuel cell.

As best shown in FIG. 5, planar-shaped body 401 has a sealed chamber 403 therein containing a heat-transferring fluid 405 so as to be configured and operable as a generally planar-shaped heat pipe. For example, as shown in FIGS. 4 and 5, body 401 of fluid flow plate 400 comprises a first or lower portion 407 operable to absorb heat to vaporize heat-transferring fluid 405 and a second or upper portion 408 operable to release heat for condensing vaporized heat-transferring fluid 405.

In particular, lower portion 407 may comprise flow channel 404a which is disposed in the working or active region of the fuel cell, and the upper portion 408 may be configured to extend outward from and beyond the working section or active area of the fuel cell. For example, a fuel cell assembly may have a plurality of fluid flow plates 400 with one of such fluid flow plates disposed within each fuel cell, or with one of such fluid flow plates disposed in every two to six fuel cells. Such a plurality of fluid flow plates 400 interspersed in a fuel cell assembly provides a plurality of outwardly extending, spaced-apart, fins that allow heat to be rejected directly to the air by either free or forced convection.

In addition, by configuring a fluid flow plate to have one or more flow channels and a hollow body with a heat-transferring fluid therein, heat which is generated at the catalyst surface of the MEA is readily and efficiently transferred through the reactant fluid directly to the fluid flow plate to thereby minimize the temperature gradients across the working section of a fuel cell assembly and along the length of the fuel cell assembly.

With reference still to FIG. 5, a layer of wicking material 420 and a layer of wicking material 422 may be attached to and in contact with the inner surfaces of body 410 to provide a means for returning heat-transferring fluid 405 from the condensing region back to and across the evaporating region. An appropriate amount of heat-transfer fluid may be chosen to provide the desired combination of vapor pressure at a desired operating temperature.

Planar-shaped body 401 may be fabricated from a pair of planar-shaped metallic sheets 410 and 412 which are sealed along corresponding overlapping outer peripherally extending edges, e.g., by welding. Desirably, a pair of planar-shaped wicks 420 and 422 may be disposed in overlapping relation to the inner surface of sheets 410 and 412, and a porous spacer 430 may be disposed between layers of wicking materials 420 and 422 to define the vapor passageway in chamber 403 to ensure transfer of vaporized liquid in chamber 403 from evaporating region 407 to condensing region 408.

Passageways 450 and 450', may extend through chamber 403 formed in body 401. For example, body 401 may be configured to be sealed or bonded together at the perimeter of the passageways. Because of the distributed nature of the wick and vapor conduit, the openings will have little effect on the function of the fluid flow plate as a heat pipe.

An alternative embodiment for a fluid flow plate 500 is shown in FIG. 7. In this exemplary embodiment, fluid flow plate 500 comprises a pair of outer sheets 510 and 512 made of thin metal foil, two "wick" sheets 520 and 522 composed of a fine wire mesh, and a single sheet 530 of coarse wire mesh which provides the vapor passageway approximately in the center of fluid flow plate 500. The two face sheets may be formed as shallow pans having a depth selected so that when placed together, the cavity formed is roughly equal to the combined thickness of the fine wire meshes and the coarse wire mesh. Such a configuration provides a stable structure for withstanding the compressive loads applied to the fuel cell assembly.

Another embodiment for a fluid flow plate 600 according to the present invention is shown in FIG. 8. In this exemplary embodiment, fluid flow plate 600 may comprise a pair of thin metallic sheets 610 and 612 which are stamped to have a plurality of flow channels 604a and 604b, and layers of wicking material 620 and 622 may be disposed along the inner surfaces of sheets 610 and 612. By orientating flow channels 604a and 604b at an angle to each other, e.g. ninety degrees, and sealing sheets 610 and 612 together, a lattice structure will be formed with vapor passages 640 (shown in dashed lines) formed between the layers of wicking material 604a and 604b.

Figure 11:
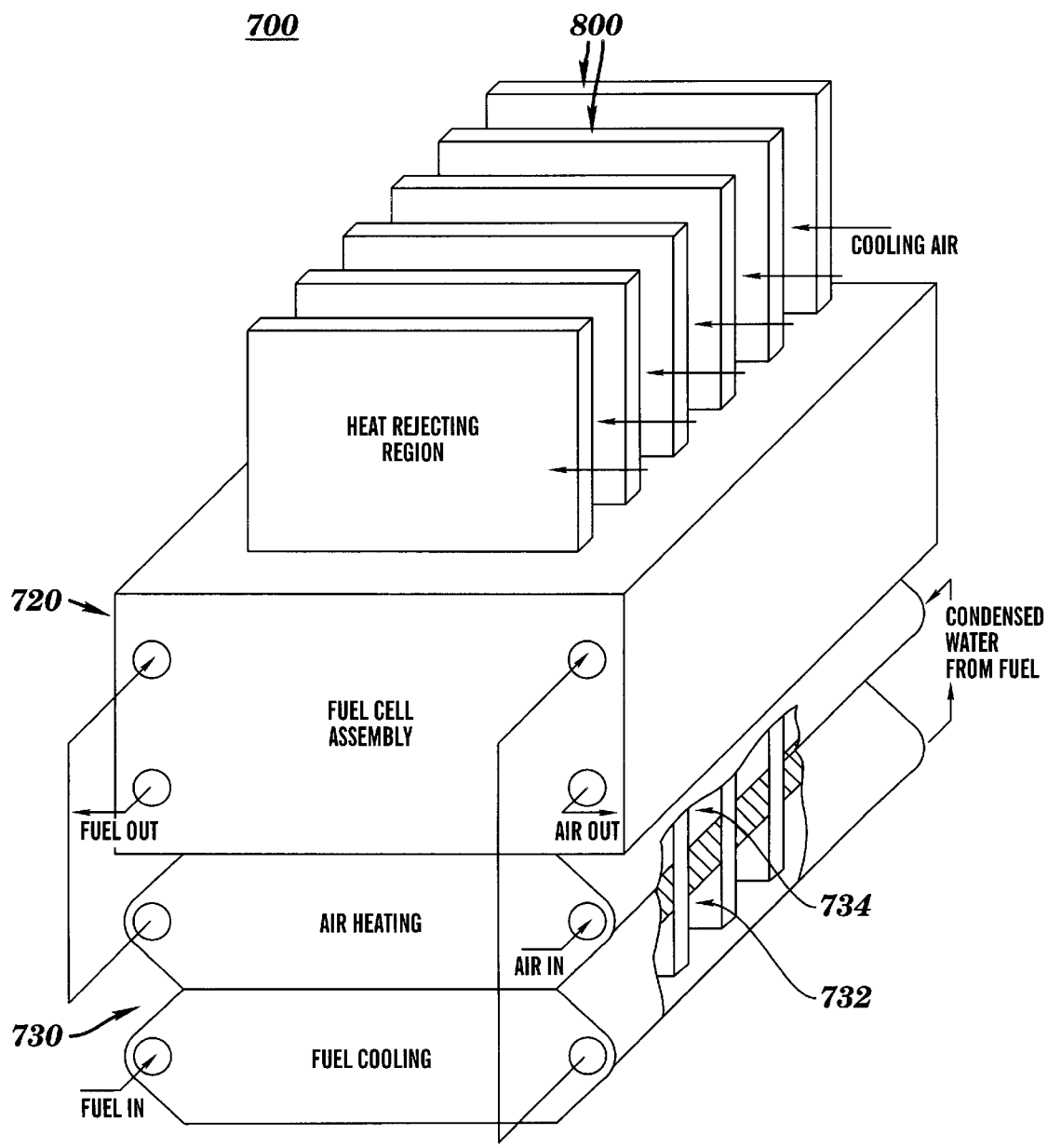
FIG. 11 is a perspective view of a fuel cell assembly system according to the present invention.
Figure 12:
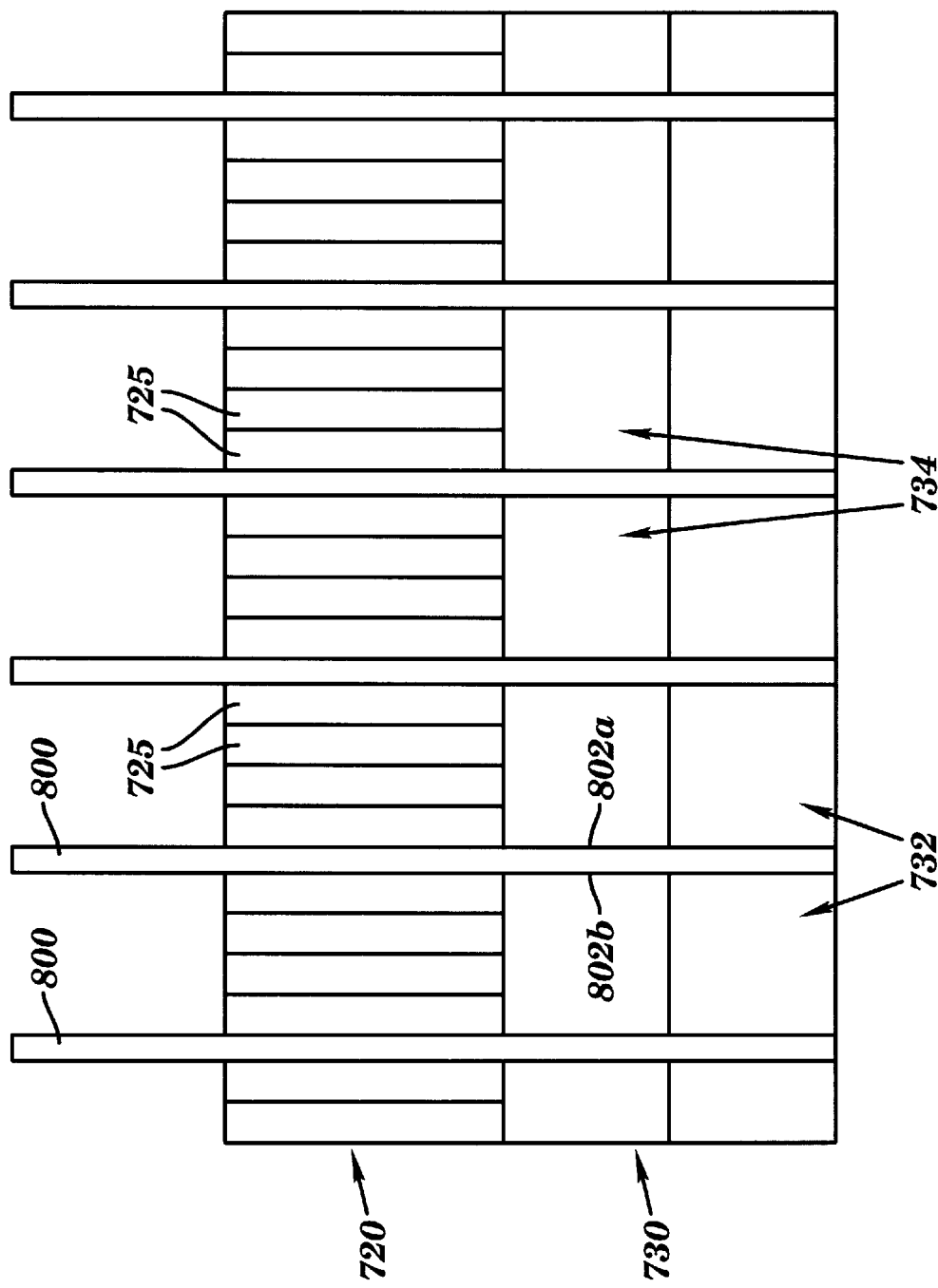
FIG. 12 is a side elevational view, in part cross-section, of the fuel cell assembly system shown in FIG. 11.

FIGS. 11 and 12 illustrate a fuel cell assembly system 700 according to the present invention which is operable for controlling the temperature of a fuel cell assembly and the temperature(s) of one or more supplies of reactant fluid. For example, system 700 may be desirably operable for preheating a fuel cell assembly, maintaining the fuel cell assembly at a desired operating temperature, cooling a supply of fuel, and preheating a supply of oxidant.

Fuel cell assembly system 700 comprises a fuel cells assembly 720 having a plurality of fuel cell 725 (FIG. 12) defining a longitudinally extending active region therein, a plurality of planar-shaped heat pipes 800 interspersed between fuel cells 725, and a housing 730 having a fuel cooling chamber 732 and an air heating chamber 734 for receiving and controlling the temperature of a supply of fuel and a supply of oxidant. Housing 730 may be attached or otherwise mounted to fuel cell assembly 720.

Desirably, heat pipes 800 are sized so as to extend above fuel cell assembly 720 to provide a heat rejecting region, extend through fuel cell assembly 720 to control the temperature of fuel cell assembly 720, extend below fuel cell assembly 720 and into housing 730 to provide a series of parallel surfaces 802a and 802b to control the temperature of a supply of fuel and a supply of air passing from one side of chambers 732 and 734, respectively, to the other side. From the present description, it will be appreciated by those skilled in the art that other orientation of these various components and regions is possible, e.g., the rejection region may extend out in a different direction, e.g., to the side.

Figures 13, 14:
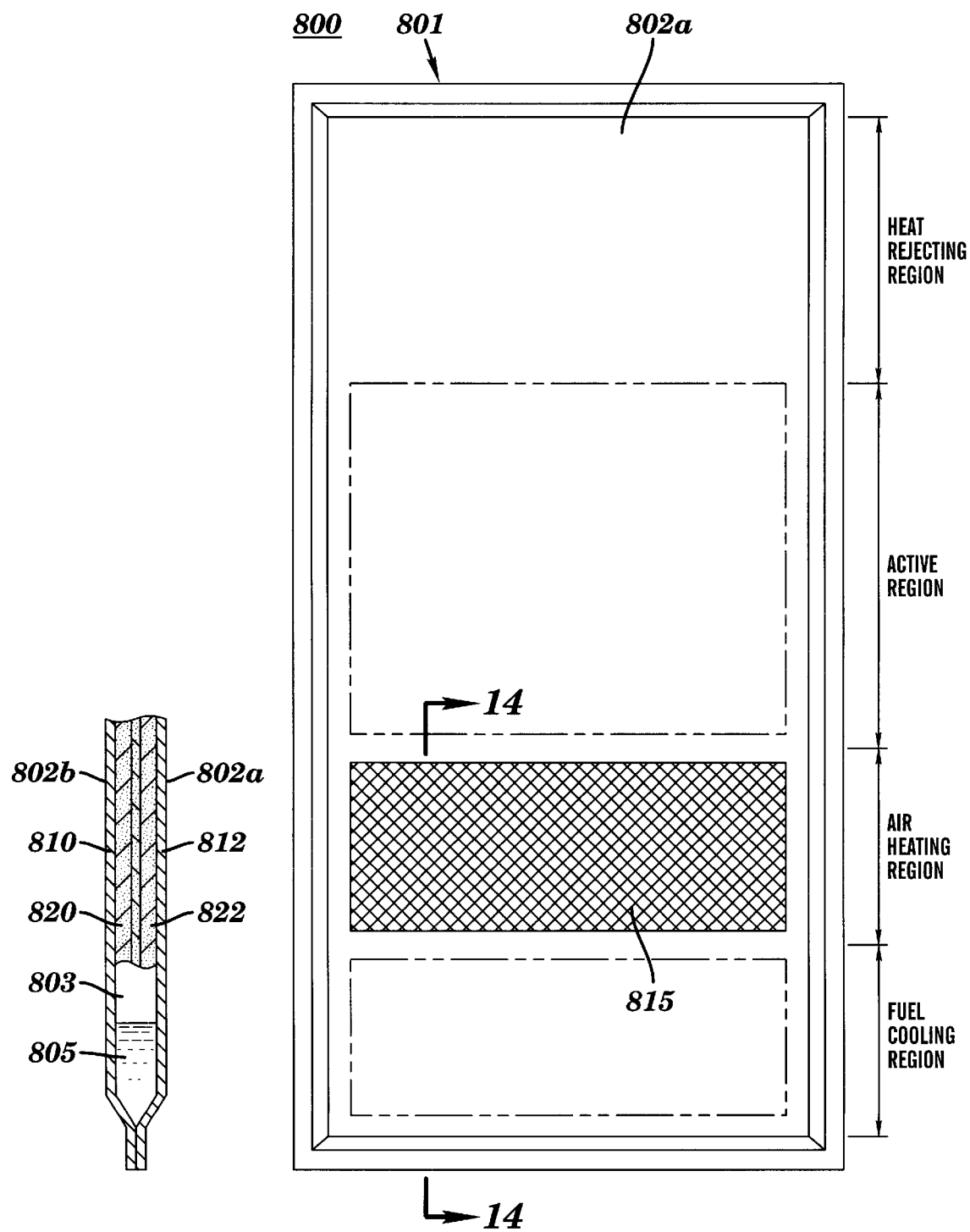
FIG. 13 is a plan view of a surface of a heat pipe shown in FIG. 11.
FIG. 14 is a cross-sectional view taken along line 14—14 in FIG. 13 showing the interior of the fluid flow plate.

As shown in FIGS. 13 and 14, heat pipe 800 has a body portion 801 with opposing planar surfaces 802a and 802b (FIG. 14). Body 801 also comprises a chamber 803 having a heat-transmitting fluid 805 (FIG. 14) therein so that portions of heat pipe 800 are operable to absorb heat to vaporize heat transferring fluid 805 and portions of heat pipe 800 are operable to release heat for condensing vaporized heat-transferring fluid 805. Desirably, heat pipe 800 comprises layers of wicking material 820 and 822 disposed in contact along inner surfaces of body 801 for distributing condensed heat-transferring fluid over evaporating regions of heat pipe 800. From the present description, it will be appreciated by those skilled in the art that planar-shaped heat pipe 800 may comprise a plurality of wire mesh screens for providing a wicking layer and vapor conduit, as described with reference to fluid flow plate 500.

With reference again to FIG. 11, in the operation of system 700, fuel cooling chamber 732 receives and reduces the temperature of a fuel stream, e.g., reformate or hydrogen-rich gas from a typical hydrocarbon reformer. The temperature of the reformate is typically about 300 degrees Centigrade and may be reduced to about 100 degrees Centigrade in chamber 732. On initial start up of fuel cell assembly 720 for converting reactant fluids in to electricity, heat extracted from the fuel stream in chamber 732 will vaporize heat-transferring fluid in heat pipes 800 which will condense along the inner surface portions of heat pipes 800 disposed in air heating chamber 734 and fuel cell assembly 720 thereby reducing the time required for fuel cell assembly to reach a desired operating temperature.

After initial start-up and once the lower regions of heat pipes 800 have reached thermal equilibrium, the vapors in the heat pipes condense in the heat rejection region of heat pipe 800. Thereafter, condensed heat-transferring fluid 805 will flow downward by gravity from the heat rejection region of the heat pipes and across the lower regions, being held in contact with the inner surface of the heat pipes by the layer of wicking material. Since the heat pipes operate at the saturation point of the working fluid, all heat pipe surfaces will tend to be very close to the same temperature.

The amount of heat rejected from heat rejection region can be controlled by using a variable speed fan operably connected to respond to, e.g., the temperature of the fuel stream as it exits the fuel cooling chamber 732. By regulating the fuel to a safe temperature, the inlet and fuel cell stack is caused to assume substantially the same temperature.

Figure 15:
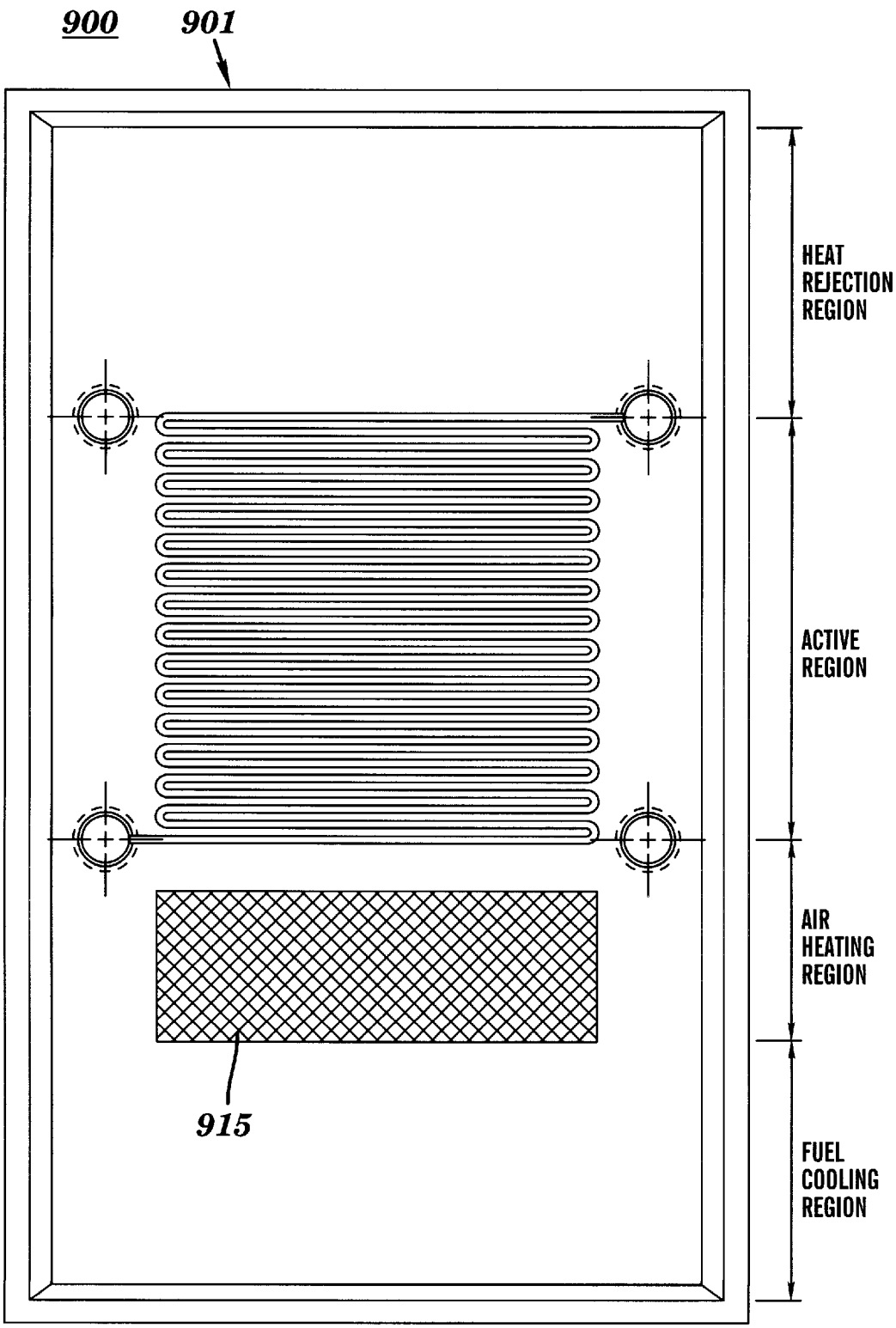
FIG. 15 is a plan view of a surface of an alternative embodiment of a fluid flow plate according to the present invention for use in the fuel cell assembly system shown in FIG. 11.

FIG. 15 illustrates a fluid flow plate 900 for use in the fuel cells of system 700. Fluid flow plate 900 has a body 901 comprising a chamber having a heat-transmitting fluid therein as described above with reference to fluid flow plates 400 and/or 500. Alternatively, system 700 may include various combinations of fluid flow plates 900, 400 and/or 500.

In addition, system 700 (having either heat pipes 800 or fluid flow plates 900) may be configured to condense water vapor in the fuel stream. The condensed water may by readily fed to the air heating chamber 734 for humidification of the supply of air to the fuel cell. Desirably, condensed water having an elevated temperature may be collected in fuel cooling chamber 732 and transferred by one or more suitable conduits into air heating chamber 734. Humidification of the air may be improved by covering the outer surfaces of heat pipe 800 or fluid flow plate 900 which extend through air heating chamber 734 with a layer of wicking material 815 (FIG. 13) and 915 (FIG. 15), respectively, and spraying condensate from the fuel stream (already at saturation temp) onto the wick material.

From the present description, it will be appreciated by those skilled in the art that the above embodiments avoid electrical short circuiting in the fuel cell assembly, since the fluid flow plates and heat pipes provide no electrical connection between each other. Freeze-up can be avoided, since the choice of heat-transfer liquid is not driven by the need for high resistance to reduce electrical short circuiting in the fuel cell assembly. Chemical contamination is avoided since there are no seals between the heat-transferring fluid and reactant fluids, i.e., heat-transferring fluid is hermetically sealed. Use of the fluid flow plates according to the present invention simplifies construction of fuel cell assemblies by eliminating the need to provide separate manifolds for supplying and circulating cooling fluid.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fluid flow plate for use in a fuel cell having an active region, the fluid flow plate comprising:
    a planar-shaped body having a sealed chamber therein containing a heat-transferring fluid;
    said planar-shaped body having a first planar-shaped portion operable to absorb heat to vaporize said heat-transferring fluid and a second planar-shaped portion operable to release heat for condensing vaporized heat-transferring fluid; and
    said first planar-shaped portion of said planar-shaped body having an outer surface having at least one flow channel for distributing a first reactant fluid to the active region of the fuel cell.

2. The fluid flow plate according to claim 1, wherein said second planar-shaped portion of said planar-shaped body extends beyond the active region of the fuel cell.

3. The fluid flow plate according to claim 1, wherein said planar-shaped at least one flow channel is integrally formed in said body.

4. A fluid flow plate for use in a fuel cell having an active region, the fluid flow plate comprising:
    a body having a sealed chamber therein containing a heat-transferring fluid;
    said body having a first portion operable to absorb heat to vaporize said heat-transferring fluid and a second portion operable to release heat for condensing vaporized heat-transferring fluid;
    said first portion of said body having an outer surface having at least one flow channel for distributing a first reactant fluid to the active region of the fuel cell; and
    wherein said body comprises at least one passageway extending through said body for receiving a reactant fluid, and said at least one flow channel further comprising an inlet opening onto said at least one passageway.

5. The fluid flow plate according to claim 4, wherein said at least one passageway defines a portion of at least one reactant fluid supply manifold in the fuel cell.

6. The fluid flow plate according to claim 4, wherein said at least one passageway comprises a first passageway extending through said body for receiving a reactant fluid and a second passageway extending through said body for exhausting the reactant fluid, and said at least one flow channel further comprising an inlet opening onto said first passageway and an outlet opening onto said second passageway.

7. The fluid flow plate according to claim 6, wherein said first passageway defines a portion of a reactant fluid supply manifold and said second passageway defines a portion of a reactant fluid exhaust manifold in the fuel cell.

8. The fluid flow plate according to claim 4, wherein said first portion of said body further comprises an opposite outer surface, and said opposite outer surface comprising at least one flow channel for distributing a second reactant fluid to an active region of an adjacent fuel cell.

9. The fluid flow plate according to claim 8, wherein said at least one passageway comprises first and second passageways extending through said body for receiving and exhausting, respectively, the first reactant fluid, and third and fourth passageways extending through said body for receiving and exhausting, respectively, the second reactant fluid, said at least one flow channel of said outer surface comprising an inlet opening onto said first passageway and an outlet opening onto said second passageway, said at least one flow channel of said opposite outer surface comprising an inlet opening onto said third passageway and an outlet opening onto said fourth passageway.

10. The fluid flow plate according to claim 1, wherein said planar-shaped body has an inner surface defining said sealed chamber, and further comprising a wick disposed in contact with at least a portion of said inner surface, and at least one of said wick and said planar-shaped body defining a vapor passageway in said chamber for transfer of vaporized heat-transferring fluid in said chamber.

11. The fluid flow plate according to claim 10, wherein said planar-shaped body comprises first and second planar-shaped members sealed around a peripherally extending edge, said wick comprising first and second planar-shaped fine wire meshes, and further comprising a coarse wire mesh disposed between said fine wire meshes to define said vapor passageway.

12. A fuel cell assembly comprising:
a plurality of fuel cells;
a portion of said plurality of fuel cells comprising at least one fluid flow plate according to claim 1.

13. The fuel cell assembly according to claim 12, wherein said at least one fluid flow plate comprises a plurality of fluid flow plates which are interspersed in said plurality of fuel cells.

14. The fuel cell assembly according to claim 12, further comprising a housing having at least one reactant supply chamber for receiving at least one supply of reactant fluid, and wherein at least one of said fluid flow plates extends into said at least one reactant supply chamber for transferring heat between said plurality of fuel cells and said at least one supply of reactant fluid.

15. The fuel cell assembly according to claim 14, wherein said at least one reactant supply chamber comprises a first chamber and a second chamber, and said at least one supply of reactant fluid comprises a supply of fuel and a supply of oxidant for said fuel cell assembly.

16. A fuel cell assembly system comprising:
a fuel cell assembly having a plurality of fuel cells defining an active region;
at least one heat pipe disposed between said plurality of fuel cells;
a housing comprising at least one chamber for receiving at least one supply of reactant fluid; and
wherein said at least one heat pipe extends into said at least one chamber for transferring heat between said fuel cell assembly and the at least one supply of reactant fluid.

17. The fuel cell assembly system according to claim 16, wherein said at least one chamber comprises a first chamber and a second chamber and the at least one supply of reactant fluid comprises a supply of reformate and a supply of air for said fuel cell assembly.

18. The system assembly system according to claim 17, wherein said at least one heat pipe comprises a planar-shaped heat pipe.

19. The system assembly system according to claim 16, wherein said housing further comprises means for humidifying the at least one supply of reactant fluid in said at least one chamber.

20. A method for forming a fluid flow plate, said method comprising:
providing a pair of planar-shaped members;
forming at least one flow channel on a surface of one of said pair of planar-shaped members;
providing a wick;
providing a heat-transferring fluid;
attaching said pair of planar-shaped members to seal said wick and said heat-transferring fluid within a chamber formed by said planar-shaped members.

21. The method according to claim 20, further comprising providing at least one passageway through said pair of planar-shaped members to form a portion of a reactant fluid manifold in a fuel cell.

22. A method for controlling heat in a fuel cell assembly system, said method comprising:
providing a plurality of heat pipes interspersed in a fuel cell assembly; and
transferring heat via said plurality of heat pipes between said fuel cell assembly and a first supply of reactant fluid.

23. The method according to claim 22, further comprising transferring heat via said plurality of heat pipes between said first supply of reactant fluid and a second supply of reactant fluid.

24. The method according to claim 22, further comprising removing heat from said fuel cell assembly via said plurality of heat pipes.

25. A method for controlling heat in a fuel cell assembly system, said method comprising:
providing a fuel cell assembly comprising a plurality of planar-shaped fluid flow plates each of which having a sealed chamber therein containing a heat-transferring fluid and each of which having an outer surface having at least one flow channel for distributing a first reactant fluid to an active region of said fuel cell assembly; and
transferring heat via said plurality of planar-shaped fluid flow plates away from said active region of said fuel cell assembly.

26. The method according to claim 25, further comprising transferring heat via said plurality of fluid flow plates between said fuel cell assembly and the first supply of reactant fluid.

27. The method according to claim 25, further comprising transferring heat via said plurality of fluid flow plates between the first reactant fluid and a second reactant fluid.

28. A method for controlling the temperature of reactant fluids to a fuel cell, said method comprising:
providing at least one heat pipe;
providing a first supply of reactant fluid;
providing a second supply of reactant fluid; and
transferring heat, via said at least one heat pipe, between said first supply of reactant fluid and said second supply of reactant fluid.

* * * * *